(12) United States Patent
Bartley et al.

(10) Patent No.: US 7,725,620 B2
(45) Date of Patent: May 25, 2010

(54) HANDLING DMA REQUESTS IN A VIRTUAL MEMORY ENVIRONMENT

(75) Inventors: Gerald Keith Bartley, Rochester, MN (US); John Michael Borkenhagen, Rochester, MN (US); William Paul Hovis, Rochester, MN (US); Daniel Paul Kolz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 785 days.

(21) Appl. No.: 11/246,824

(22) Filed: Oct. 7, 2005

(65) Prior Publication Data

US 2007/0083681 A1    Apr. 12, 2007

(51) Int. Cl.
*G06F 13/28* (2006.01)
*G06F 3/00* (2006.01)
*G06F 5/00* (2006.01)
*G06F 13/00* (2006.01)
*G06F 9/34* (2006.01)

(52) U.S. Cl. .............. 710/22; 710/26; 710/52; 710/53; 711/150; 711/165; 711/207

(58) Field of Classification Search .............. 710/22
See application file for complete search history.

(56) References Cited

U.S. PATENT DOCUMENTS

| | | | |
|---|---|---|---|
| 4,590,467 A * | 5/1986 | Lare | 370/462 |
| 4,658,351 A | 4/1987 | Teng | |
| 5,276,848 A | 1/1994 | Gallagher et al. | |
| 5,463,739 A | 10/1995 | Albaugh et al. | |
| 5,640,527 A | 6/1997 | Pecone et al. | |
| 5,778,427 A | 7/1998 | Hagersten et al. | |
| 2003/0191881 A1 * | 10/2003 | Arndt et al. | 710/240 |
| 2004/0064601 A1 | 4/2004 | Swanberg | |
| 2006/0069818 A1 * | 3/2006 | Mather et al. | 710/22 |
| 2006/0181949 A1 * | 8/2006 | Kini | 365/230.03 |
| 2007/0074067 A1 | 3/2007 | Rothman et al. | |

* cited by examiner

*Primary Examiner*—Niketa I Patel
*Assistant Examiner*—Zachary K Huson
(74) *Attorney, Agent, or Firm*—Martin & Associates LLC; Derek P. Martin

(57) ABSTRACT

An apparatus includes a virtual memory manager that moves data from a first block to second block in memory. When the virtual memory manager is ready to transfer data from the first block to the second block, a third, temporary block of memory is defined. The translation table in a DMA controller is changed to point DMA transfers that target the first block to instead target the temporary block. The virtual memory manager then transfers data from the first block to the second block. When the transfer is complete, a check is made to see if the DMA transferred data to the temporary block while the data from the first block was being written to the second block. If so, the data written to the temporary block is written to the second block. A hardware register is preferably used to efficiently detect changes to the temporary block.

8 Claims, 3 Drawing Sheets

HANDLING DMA REQUESTS IN A VIRTUAL MEMORY ENVIRONMENT

BACKGROUND OF THE INVENTION

1. Technical Field

This invention generally relates to computer systems, and more specifically relates to the processing of Direct Memory Access (DMA) requests in computer systems that provide a virtual memory environment.

2. Background Art

Many computer systems have a virtual memory environment, where virtual addresses are mapped to physical addresses in memory. One specific type of virtual memory environment defines multiple logical partitions on a single platform, thereby allowing each logical partition to appear from the client perspective to be a separate and unique computer system. In a logically partitioned computer system, there is often a need for I/O devices such as hard disk drives to write to memory. Such transfers between a hard disk drive and memory often occur via a direct memory access (DMA) controller in the bus chipset. Because DMA transfers occur asynchronously with respect to processor events, such a DMA transfer could potentially cause data coherency problems. For example, let's assume the virtual memory manager decides to move data from block A to block B in memory. In the prior art, it is possible for the DMA controller to write to block A before the move from block A to block B is complete. If the write to block A occurs at a location that has already been copied to block B, block B now has stale data, which can result in a bus or system crash. Without a way to assure data coherency in a computer system that includes a DMA controller and a virtual memory system, the computer industry will continue to suffer from potential crashes and other problems due to data coherency problems.

DISCLOSURE OF INVENTION

According to the preferred embodiments, an apparatus includes a virtual memory manager that moves data from a first block to second block in memory. When the virtual memory manager is ready to transfer data from the first block to the second block, a third block of memory is defined that is a temporary block. The translation table in a DMA controller is changed to point DMA transfers to the third block. The virtual memory manager then transfers data from the first block to the second block. When the transfer is complete, a check is made to see if the DMA transferred data to the temporary block while the data from the first block was being written to the second block. If so, the data written to the temporary block is written to the second block. A hardware Modification Recording Register (MRR) is preferably used to efficiently detect changes to the temporary block. The MRR includes a plurality of bits, each bit corresponding to a defined block of the memory, wherein the value of each bit is a one if the DMA controller wrote data to the defined block corresponding to the bit, and is a zero if the DMA controller did not write data to the defined block corresponding to the bit. If the MRR is non-zero, the MRR is traversed one bit at a time, writing the memory blocks corresponding to the one bits in the register from the temporary block to the second block, and clearing the one bits to zero after the memory blocks are written to the second block. Once all bits have been cleared (meaning that all corresponding memory blocks have been written to the second block), another check is made of the MRR to assure that no additional DMA transfers occurred during the clearing of the MRR bits on the previous pass. This process continues until all MRR bits are zero, indicating that no DMA transfer occurred since the last check of the MRR.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The preferred embodiments provide a way to assure data integrity in a system running a virtual memory manager where DMA transfers to memory are allowed. The DMA transfers are redirected to a temporary location when a data block in memory needs to be moved from a first location to a second location. The data block is moved, and a check is then made to determine whether a write to the temporary location occurred during the move. If so, the data written to the temporary location is written to the second location, and another check is made to determine whether any writes to the temporary location occurred. In the most preferred implementation, a hardware register tracks when changes are made to the temporary location, allowing easily determining from the state of the register whether any data needs to be copied from the temporary location to the second location.

Figure 1:
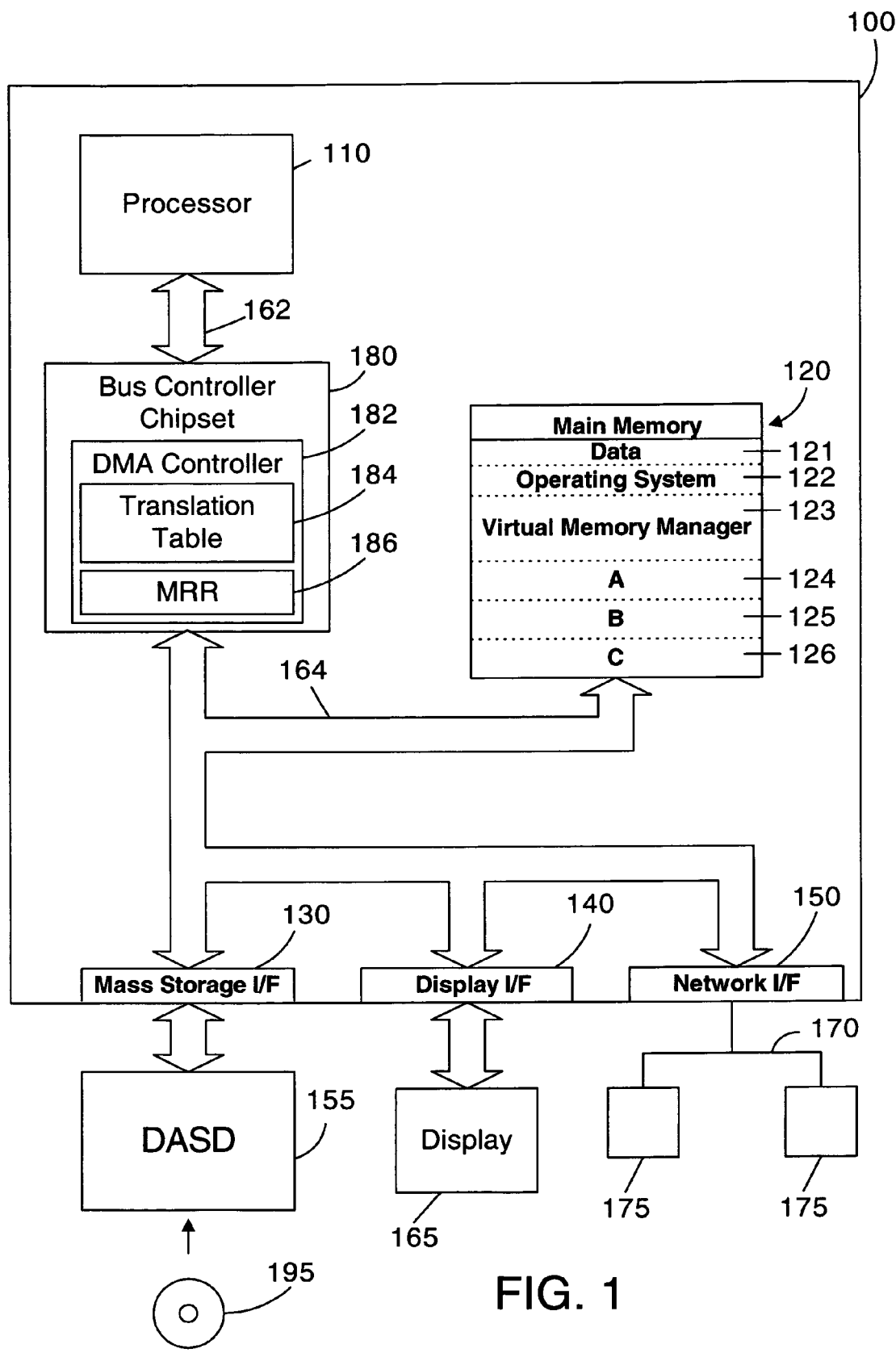
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. The processor 110 is coupled to a bus controller chipset 180 via a processor bus 162. The bus controller chipset 180 is coupled to the main memory 120, mass storage interface 130, display interface 140, and network interface 150 via a system bus 164. Mass storage interface 130 is used to connect mass storage devices, such as a direct access storage device 155, to computer system 100. One specific type of direct access storage device 155 is a readable and writable CD RW drive, which may store data to and read data from a CD RW 195. Another specific type of direct access storage device 155 is a hard disk drive.

Main memory 120 in accordance with the preferred embodiments contains data 121, an operating system 122, a virtual memory manager 123, and defined blocks of memory 124, 125 and 126. Data 121 represents any data that serves as input to or output from any program in computer system 100. Operating system 122 is a multitasking operating system known in the industry as i5/OS; however, those skilled in the art will appreciate that the spirit and scope of the present invention is not limited to any one operating system. Blocks of memory 124-126 are managed by the virtual memory manager 123. Because a single hard disk drive may be partitioned to appear as separate logical drives for different logical partitions, the virtual memory manager must manage the sharing of the disk drive between logical partitions. This sharing of a hardware resource among multiple logical partitions often requires copying data between memory locations. Thus, virtual memory manager 123 may periodically move data from one block in memory 120 to another block in memory. Memory blocks 124-126 are shown as arbitrary blocks of memory that could be managed by the virtual memory manager 123.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, and virtual memory management mechanism 123 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiments each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

The bus controller chipset 180 may control the functions of any suitable bus, including without limitation Peripheral Component Interconnect (PCI), PCI Extended PCI-X) and PCI Express buses. Note that these buses differ in how they handle DMA transfers. In the case of a PCI or PCI-X bus, the device that wants to perform a DMA transfer can be told to wait. However, in the case of a PCI Express bus, there is no way to tell the device to wait. Thus, if a virtual memory manager is performing a move of data from a first block to a second block, the DMA controller could write data to the first block after that portion of the first block was already moved, resulting in a data coherency problem that results in incorrect data in the second block, because the data transferred by the DMA controller is written to the first block instead of the second block.

The bus controller chipset 180 includes a DMA controller 182 that allows devices to directly transfer data without processor intervention. DMA controller 182 includes a translation table 184 that provides a translation for a virtual address to a corresponding physical address in memory. The DMA controller 182 also includes a Modification Recording Register (MRR) 186. The MRR 186 has many bits, with each bit corresponding to a defined block of memory. If the DMA controller writes to a block of memory that is being tracked by the MRR, the corresponding bit in the MRR is set to a one, indicating a change was made to that memory block. This hardware support in the form of the MRR register 186 is explained in more detail below with reference to FIGS. 3 and 4.

Note that bus controller chipset 180 is shown separate from the processor 110 in FIG. 1. However, the preferred embodiments expressly extend to implementations where the bus controller functions are integrated in the processor itself.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links. Note that the preferred signal bearing media is tangible.

Figure 2:
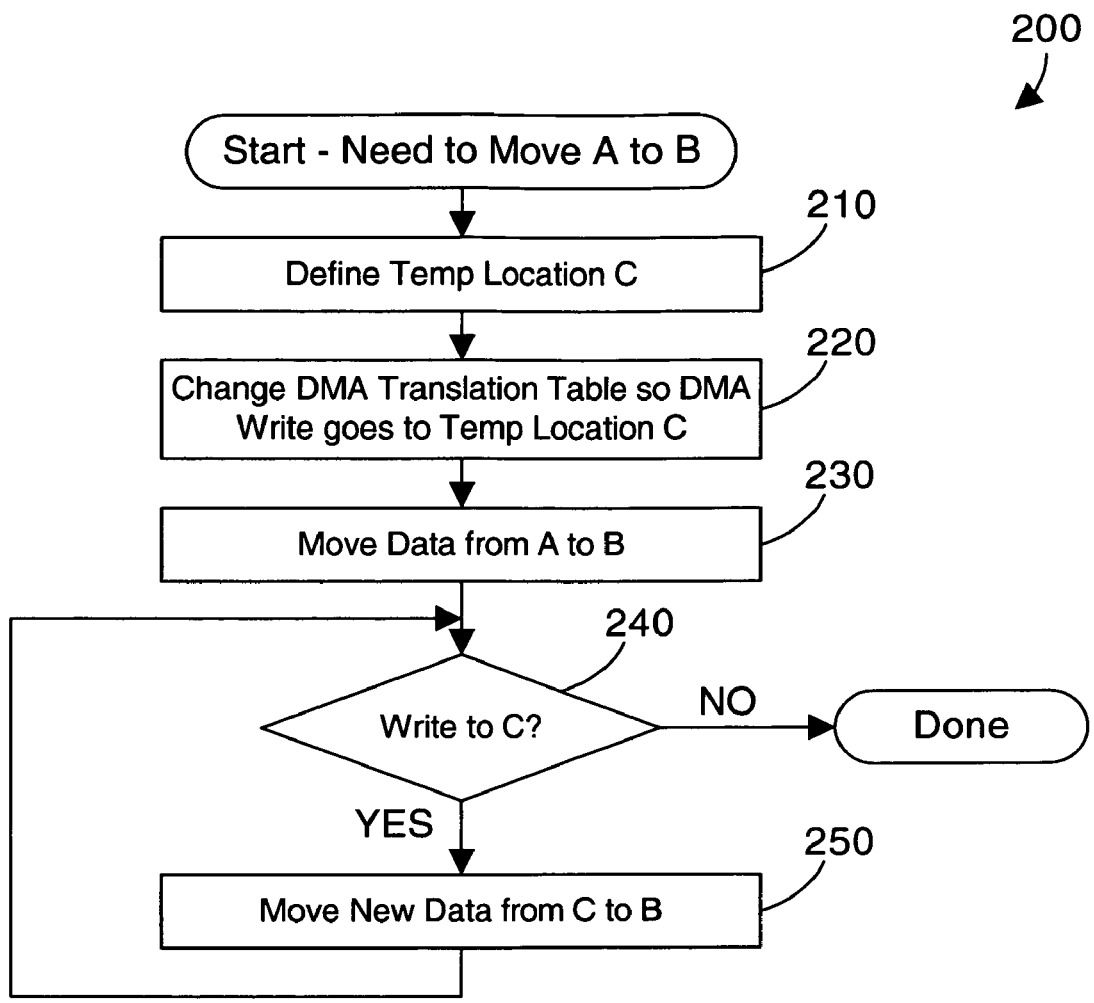
FIG. 2 is flow diagram of a method in accordance with the preferred embodiments.

Referring to FIG. 2, a method 200 in accordance with the preferred embodiments is performed by the virtual memory manager 123 in FIG. 1 when data in block A 124 needs to be written to block B 125. First, a temporary location we'll call block C 126 is defined (step 210). The virtual memory manager 123 writes to the DMA translation table 184 so any future DMA writes that would normally be written to block A are instead written to block C (step 220). The virtual memory manager then moves the data from block A to block B (step 230). Because DMA transfers are asynchronous to the processor 110 that is executing the virtual memory manager 123, it is possible for a DMA transfer to occur during the move of data from block A to block B in step 230. For this reason, method 200 must now determine whether any DMA writes were performed during the move. This can be done by determining whether any data was written to block C (step 240). If not (step 240=NO), we know that no DMA transfer to block C occurred, and method 200 is done. If data was written to block C (step 240=YES), the new data in block C is moved to block B (step 250). Method 200 then loops back to step 240 to see if another write to block C has occurred that has not been written to block B (step 240). This process continues until there has not been a write to C that has not been written to block B (step 240=NO). By defining a new, temporary block C, method 200 allows DMA transfers to take place at the same time a block of data in the memory is being moved.

One way to determine whether a write was made to block C in step 240 of FIG. 2 is to initialize each location in block C to be some initial value, such a zero, and then read block C after the move of data from block A to block B to see which locations in block C are non-zero. This solution is a software-based solution, and while effective, is relatively slow. To increase performance, a hardware register may be defined that indicates when data is written by the DMA controller 182 to block C. This register is referred to herein as a Modification Recording Register (MRR) 186, and is shown in more detail in FIG. 3. The MRR includes a plurality of bits, with each bit corresponding to a defined block of memory. Thus, we see from FIG. 3 that bit 0 of the MRR corresponds to memory block 0; bit 1 of the MRR corresponds to memory block 1, and so on to the last bit N that corresponds to memory block N. The MRR is initially cleared to all zeroes. When a write by the DMA controller occurs to one of the memory blocks that have a corresponding bit in the MRR, the corresponding bit is set to a one to indicate that something in that block was modified by the DMA controller. Note that the memory blocks that correspond to MRR bits may have any suitable level of granularity. In one example implementation for the iSeries computer system developed by IBM, each memory segment is one page, or 4 k bytes. Writes to each page are done by cache lines, which are 128 bytes. If any of the cache lines in a page are modified by the DMA controller, the bit corresponding to the page is set to one. Thus, after the move of data from block A to block B in step 230 of FIG. 2, the MRR can be scanned to determine which bits are set to one. In the most preferred implementation, the MRR is scanned one bit at a time. When a one is encountered, the corresponding data block is written to block B, and the bit is then cleared to zero. This continues in serial fashion, one bit at a time, until the data corresponding to all the one bits in the MRR has been copied to block B. Note that during the process of clearing the MRR, a DMA transfer could occur, which could set a one bit that has already been scanned. Because of this, after clearing all one bits in the MRR, the MRR is scanned again to make sure no DMA transfers occurred during the processing of the MRR. If any of the bits are one, the corresponding data blocks are written to block B. This process continues until the MRR is all zeroes, indicating that no DMA transfer occurred since the last time the MRR was checked. The preferred embodiments thus assure data coherency when running a virtual memory manager with DMA accesses enabled.

Figure 3:
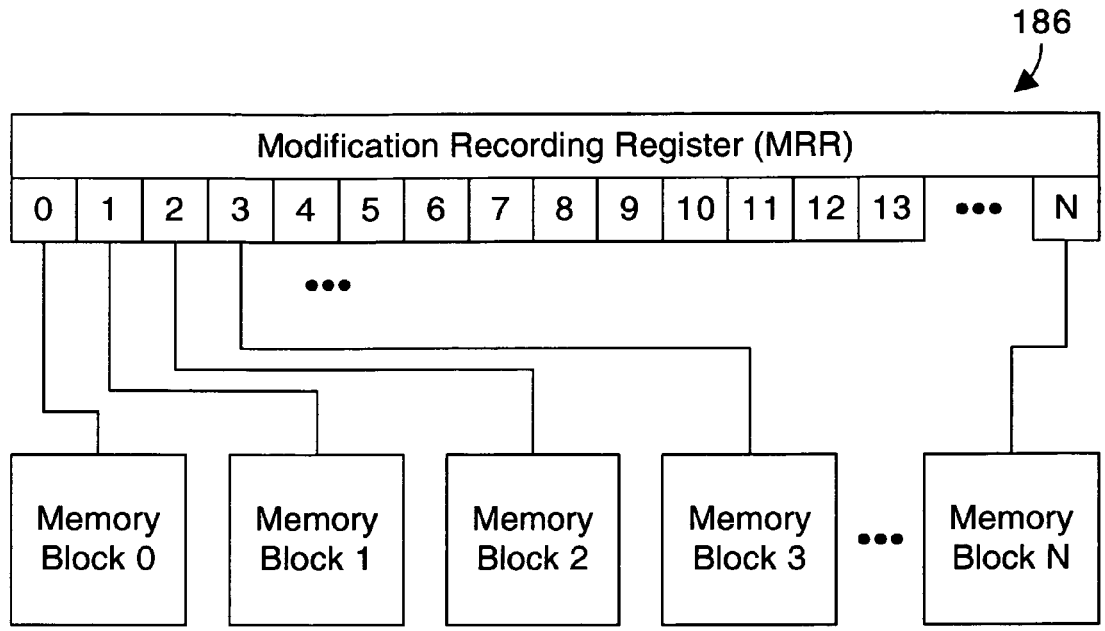
FIG. 3 is a block diagram of a modification recording register (MRR) and corresponding memory blocks in accordance with the preferred embodiments.
Figure 4:
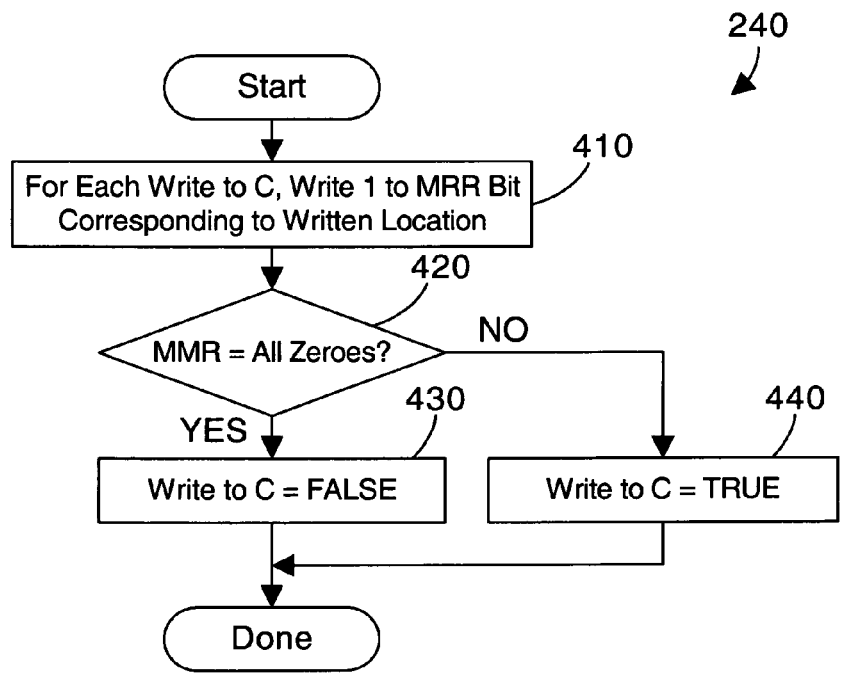
FIG. 4 is flow diagram of a method for one specific implementation for step 240 in FIG. 2 that uses the MRR shown in FIG. 3 in accordance with the preferred embodiments.

Referring to FIG. 4, a method 240 represents one suitable implementation for step 240 in FIG. 2 when using the MRR 186 shown in FIG. 3. For each write to block C, a one is written to the MRR bit corresponding to the written location (step 410). If the MRR is all zeroes (step 420=YES), there was no write to block C by the DMA controller, so the write to C is set to false (step 430). If the MRR is not all zeroes (step 420=NO), there was a write to block C by the DMA control-ler, so the write to C is set to true (step 440). Method 240 is then done. The MRR 186 provides a quick and efficient way to determine whether the DMA controller made any writes to block C during the move of data from block A to block B by the virtual memory manager. Referring again to FIG. 1, the hardware in the DMA controller 182 enforces that the MRR 186 is all zeroes before allowing the address in the translation table 184 to be changed.

The preferred embodiments provide a way for a virtual memory manager to move a block of data in memory without fear that the data will be corrupted by a DMA transfer. A temporary block is defined, and the translation table in the DMA controller is changed so future writes will be to the temporary block. The data in the memory is then moved, then a check is made to see if the DMA controller wrote to the temporary block during the move. If so, the data written to the temporary block is also moved, and this process continues until the DMA controller made no writes to the temporary block. In this manner, data coherency is assured in a system running a virtual memory manager with DMA accesses enabled.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A computer-implemented method for moving data from a first block to a second block in a memory, the method comprising the steps of:
  (A) creating a temporary block in the memory;
  (B) changing an address translation table in a Direct Memory Access (DMA) controller to cause future writes by the DMA controller to be written to the temporary block;
  (C) moving data from a first block to a second block in the memory;
  (D) determining after the move of data in step (C) if any write to the temporary block by the DMA controller occurred during the move of data in step (C); and
  (E) if any write to the temporary block by the DMA controller occurred during the move of data in step (C), writing the data written by the DMA controller during the move of data in step (C) from the temporary block to the second block.

2. The method of claim 1 further comprising the step of:
  (F) if any write to the temporary block by the DMA controller occurred during the writing of the data in step (L), writing the data written by the DMA controller during the writing of the data in step (L) from the temporary block to the second block.

3. The method of claim 2 further comprising the step of:
  (G) repeating step (F) until the DMA controller writes no data to the temporary block during the writing of the data in step (F).

4. The method of claim 3 wherein step (D) is performed by checking the state of a hardware register that reflects changes to the temporary block by the DMA controller.

5. The method of claim 4 wherein the hardware register resides in the DMA controller.

6. The method of claim 4 wherein the hardware register includes a plurality of bits, each bit corresponding to a defined block in the temporary block, wherein the value of each bit is a one if the DMA controller wrote data to the defined block corresponding to the bit, and is a zero if the DMA controller did not write data to the defined block corresponding to the bit.

7. The method of claim 6 wherein each bit of the hardware register that is a one is changed to a zero when data in the corresponding block in the temporary block is written to the second block.

8. A computer-implemented method for moving data from a first block to a second block in a memory, the method comprising the steps of:
   (A) creating a temporary block in the memory;
   (B) changing an address translation table in a DMA controller to cause future writes by the DMA controller to be written to the temporary block;
   (C) moving data from a first block to a second block in the memory;
   (D) determining after the move of data in step (C) if any write to the temporary block by the DMA controller occurred during the move of data in step (C) by checking the state of a hardware register in the DMA controller that reflects changes to the temporary block by the DMA controller, wherein the hardware register includes a plurality of bits, each bit corresponding to a defined block in the temporary block, wherein the value of each bit is a one if the DMA controller wrote data to the defined block corresponding to the bit, and is a zero if the DMA controller did not write data to the defined block corresponding to the bit;
   (E) if any write to the temporary block by the DMA controller occurred during the move of data in step (C) as indicated by at least one bit in the hardware register having a value of one, writing the data written by the DMA controller during the move of data in step (C) from the temporary block to the second block, and changing each bit of the hardware register that is a one to a zero when data in the corresponding block in the temporary block is written to the second block;
   (F) if any write to the temporary block by the DMA controller occurred during the writing of the data in step (E) as indicated by at least one bit in the hardware register having a value of one, writing the data written by the DMA controller during the writing of the data in step (E) from the temporary block to the second block, and changing each bit of the hardware register that is a one to a zero when data in the corresponding block in the temporary block is written to the second block; and
   (G) repeating step (F) until all bits in the hardware register have a value of zero.

\* \* \* \* \*